(12) United States Patent
Benkley, III

(10) Patent No.: US 8,224,044 B2
(45) Date of Patent: *Jul. 17, 2012

(54) FINGERPRINT SENSING ASSEMBLIES AND METHODS OF MAKING

(75) Inventor: Fred G. Benkley, III, Andover, MA (US)

(73) Assignee: Validity Sensors, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/786,211

(22) Filed: May 24, 2010

(65) Prior Publication Data

US 2010/0272329 A1    Oct. 28, 2010

Related U.S. Application Data

(63) Continuation of application No. 11/243,100, filed on Oct. 4, 2005, now Pat. No. 7,751,601.

(60) Provisional application No. 60/615,718, filed on Oct. 4, 2004.

(51) Int. Cl.
*G06K 9/00* (2006.01)
*G01R 27/16* (2006.01)

(52) U.S. Cl. ....... 382/124; 382/125; 382/312; 340/5.53; 340/5.83; 324/658; 324/661; 324/662; 324/686

(58) Field of Classification Search .................. 382/115, 382/124, 125, 181, 312, 106, 107; 340/5.53, 340/5.83; 324/658, 661, 662, 686
See application file for complete search history.

(56) References Cited

U.S. PATENT DOCUMENTS

| | | | |
|---|---|---|---|
| 4,151,512 A | 4/1979 | Rigannati et al. | |
| 4,310,827 A | 1/1982 | Asai | |
| 4,353,056 A | 10/1982 | Tsikos | |
| 4,405,829 A | 9/1983 | Rivest et al. | |
| 4,525,859 A | 6/1985 | Bowles et al. | |
| 4,550,221 A * | 10/1985 | Mabusth | 178/18.06 |
| 4,580,790 A | 4/1986 | Doose | |

(Continued)

FOREIGN PATENT DOCUMENTS

DE    2213813 A1    10/1973

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Jason M Repko
*Assistant Examiner* — Mia M Thomas
(74) *Attorney, Agent, or Firm* — Greenberg Traurig LLP; Cecily Anne O'Regan; William C. Cray

(57) ABSTRACT

A fingerprint sensing module includes a sensor substrate having a sensing side and a circuit side, an image sensor including conductive traces on the circuit side of the sensor substrate, and a sensor circuit including at least one integrated circuit mounted on the circuit side of the sensor substrate and electrically connected to the image sensor. The sensor substrate may be a flexible substrate. The module may include a velocity sensor on the sensor substrate or on a separate substrate. The module may further include a rigid substrate, and the sensor substrate may be affixed to the rigid substrate.

31 Claims, 11 Drawing Sheets

U.S. PATENT DOCUMENTS

| | | |
|---|---|---|
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hau et al. |
| 5,305,017 A * | 4/1994 | Gerpheide ............. 345/174 |
| 5,319,323 A | 6/1994 | Fong |
| 5,325,442 A * | 6/1994 | Knapp ............. 382/124 |
| 5,420,936 A * | 5/1995 | Fitzpatrick et al. ........ 382/124 |
| 5,422,807 A | 6/1995 | Mitra et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A * | 5/1997 | De Winter et al. ......... 73/514.32 |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor et al. |
| 5,852,670 A * | 12/1998 | Setlak et al. ............. 382/126 |
| 5,864,296 A * | 1/1999 | Upton ............. 340/5.53 |
| 5,887,343 A | 3/1999 | Salatino et al. |
| 5,892,824 A | 4/1999 | Beatson et al. |
| 5,903,225 A * | 5/1999 | Schmitt et al. ............. 340/5.25 |
| 5,915,757 A | 6/1999 | Tsuyama et al. |
| 5,920,384 A | 7/1999 | Borza |
| 5,920,640 A | 7/1999 | Salatino et al. |
| 5,940,526 A * | 8/1999 | Setlak et al. ............. 382/124 |
| 5,999,637 A | 12/1999 | Toyoda et al. |
| 6,002,815 A * | 12/1999 | Immega et al. ............. 382/312 |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,134,340 A | 10/2000 | Hsu et al. |
| 6,157,722 A | 12/2000 | Lerner et al. |
| 6,161,213 A | 12/2000 | Lofstrom |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,332,193 B1 | 12/2001 | Glass et al. |
| 6,333,989 B1 | 12/2001 | Borza |
| 6,337,919 B1 | 1/2002 | Dunton |
| 6,346,739 B1 * | 2/2002 | Lepert et al. ............. 257/532 |
| 6,347,040 B1 | 2/2002 | Fries et al. |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 * | 6/2002 | Senior ............. 382/124 |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,597,289 B2 | 7/2003 | Sabatini |
| 6,643,389 B1 * | 11/2003 | Raynal et al. ............. 382/124 |
| 6,672,174 B2 * | 1/2004 | Deconde et al. ......... 73/862.046 |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 * | 8/2004 | Tschudi et al. ............. 382/124 |
| 6,838,905 B1 | 1/2005 | Doyle |
| 6,886,104 B1 | 4/2005 | McClurg et al. |
| 6,897,002 B2 * | 5/2005 | Teraoka et al. ............. 430/114 |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 * | 9/2005 | Okada ............. 73/504.02 |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,020,591 B1 | 3/2006 | Wei et al. |
| 7,030,860 B1 | 4/2006 | Hsu et al. |
| 7,042,535 B2 * | 5/2006 | Katoh et al. ............. 349/77 |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschudi |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,194,392 B2 | 3/2007 | Tuken et al. |
| 7,197,168 B2 | 3/2007 | Russo |
| 7,200,250 B2 | 4/2007 | Chou |
| 7,251,351 B2 * | 7/2007 | Mathiassen et al. ......... 382/124 |
| 7,258,279 B2 | 8/2007 | Schneider et al. |
| 7,290,323 B2 * | 11/2007 | Deconde et al. ............. 29/595 |
| 7,308,122 B2 | 12/2007 | McClurg et al. |
| 7,321,672 B2 | 1/2008 | Sasaki et al. |
| 7,360,688 B1 | 4/2008 | Harris |
| 7,379,569 B2 * | 5/2008 | Chikazawa et al. ........... 382/124 |
| 7,409,876 B2 * | 8/2008 | Ganapathi et al. ........ 73/862.046 |
| 7,412,083 B2 * | 8/2008 | Takahashi ............. 382/124 |
| 7,424,618 B2 | 9/2008 | Roy et al. |
| 7,447,911 B2 | 11/2008 | Chou et al. |
| 7,460,697 B2 * | 12/2008 | Erhart et al. ............. 382/124 |
| 7,463,756 B2 * | 12/2008 | Benkley, III ............. 382/126 |
| 7,505,611 B2 | 3/2009 | Fyke |
| 7,505,613 B2 | 3/2009 | Russo |
| 7,574,022 B2 | 8/2009 | Russo |
| 7,643,950 B1 | 1/2010 | Getzin et al. |
| 7,646,897 B2 | 1/2010 | Fyke |
| 7,681,232 B2 * | 3/2010 | Nordentoft et al. ............. 726/9 |
| 7,751,601 B2 * | 7/2010 | Benkley, III ............. 382/124 |
| 7,843,438 B2 * | 11/2010 | Onoda ............. 345/173 |
| 7,953,258 B2 | 5/2011 | Dean et al. |
| 7,953,259 B2 | 5/2011 | McClurg |
| 8,005,276 B2 | 8/2011 | Dean et al. |
| 2001/0026636 A1 | 10/2001 | Mainguet |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0067845 A1 * | 6/2002 | Griffis ............. 382/107 |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 * | 2/2003 | Benkley, III ............. 382/124 |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0141959 A1 | 7/2003 | Keogh et al. |
| 2003/0147015 A1 * | 8/2003 | Katoh et al. ............. 349/5 |
| 2003/0161510 A1 | 8/2003 | Fujii |
| 2003/0161512 A1 * | 8/2003 | Mathiassen et al. ......... 382/124 |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. ............. 430/114 |

| | | | |
|---|---|---|---|
| 2003/0209293 A1 | 11/2003 | Sako et al. | |
| 2003/0224553 A1* | 12/2003 | Manansala | 438/106 |
| 2004/0012773 A1* | 1/2004 | Puttkammer | 356/71 |
| 2004/0022001 A1 | 2/2004 | Chu et al. | |
| 2004/0050930 A1 | 3/2004 | Rowe | |
| 2004/0066613 A1 | 4/2004 | Leitao | |
| 2004/0076313 A1 | 4/2004 | Bronstein et al. | |
| 2004/0081339 A1 | 4/2004 | Benkley | |
| 2004/0096086 A1 | 5/2004 | Miyasaka | |
| 2004/0113956 A1 | 6/2004 | Bellwood et al. | |
| 2004/0120400 A1 | 6/2004 | Linzer | |
| 2004/0125993 A1 | 7/2004 | Zhao et al. | |
| 2004/0129787 A1* | 7/2004 | Saito et al. | 235/492 |
| 2004/0136612 A1 | 7/2004 | Meister et al. | |
| 2004/0172339 A1 | 9/2004 | Snelgrove et al. | |
| 2004/0179718 A1* | 9/2004 | Chou | 382/115 |
| 2004/0184641 A1 | 9/2004 | Nagasaka et al. | |
| 2004/0190761 A1* | 9/2004 | Lee | 382/124 |
| 2004/0208346 A1 | 10/2004 | Baharav et al. | |
| 2004/0208347 A1 | 10/2004 | Baharav et al. | |
| 2004/0208348 A1 | 10/2004 | Baharav et al. | |
| 2004/0213441 A1 | 10/2004 | Tschudi | |
| 2004/0215689 A1 | 10/2004 | Dooley et al. | |
| 2004/0228505 A1 | 11/2004 | Sugimoto | |
| 2004/0228508 A1 | 11/2004 | Shigeta | |
| 2004/0240712 A1 | 12/2004 | Rowe et al. | |
| 2004/0252867 A1* | 12/2004 | Lan et al. | 382/124 |
| 2005/0031174 A1 | 2/2005 | Ryhanen et al. | |
| 2005/0036665 A1 | 2/2005 | Higuchi | |
| 2005/0047485 A1 | 3/2005 | Khayrallah et al. | |
| 2005/0100196 A1* | 5/2005 | Scott et al. | 382/124 |
| 2005/0109835 A1 | 5/2005 | Jacoby et al. | |
| 2005/0110103 A1 | 5/2005 | Setlak | |
| 2005/0136200 A1 | 6/2005 | Durell et al. | |
| 2005/0139656 A1 | 6/2005 | Arnouse | |
| 2005/0162402 A1 | 7/2005 | Watanachote | |
| 2005/0169503 A1 | 8/2005 | Howell et al. | |
| 2005/0210271 A1 | 9/2005 | Chou et al. | |
| 2005/0219200 A1 | 10/2005 | Weng | |
| 2005/0231213 A1 | 10/2005 | Chou et al. | |
| 2005/0238212 A1 | 10/2005 | Du et al. | |
| 2005/0244038 A1* | 11/2005 | Benkley, III | 382/126 |
| 2005/0244039 A1 | 11/2005 | Geoffroy et al. | |
| 2005/0249386 A1 | 11/2005 | Juh | |
| 2005/0258952 A1 | 11/2005 | Utter et al. | |
| 2005/0269402 A1 | 12/2005 | Spitzer et al. | |
| 2006/0006224 A1 | 1/2006 | Modi | |
| 2006/0055500 A1 | 3/2006 | Burke et al. | |
| 2006/0066572 A1 | 3/2006 | Yumoto et al. | |
| 2006/0076926 A1 | 4/2006 | Lee | |
| 2006/0078176 A1 | 4/2006 | Abiko et al. | |
| 2006/0083411 A1* | 4/2006 | Benkley, III | 382/124 |
| 2006/0110537 A1 | 5/2006 | Huang et al. | |
| 2006/0140461 A1 | 6/2006 | Kim et al. | |
| 2006/0144953 A1 | 7/2006 | Takao | |
| 2006/0170528 A1 | 8/2006 | Funushige et al. | |
| 2006/0187200 A1 | 8/2006 | Martin | |
| 2006/0210082 A1 | 9/2006 | Devadas et al. | |
| 2006/0214512 A1 | 9/2006 | Iwata | |
| 2006/0239514 A1 | 10/2006 | Watanabe et al. | |
| 2006/0249008 A1 | 11/2006 | Luther | |
| 2006/0259873 A1 | 11/2006 | Mister | |
| 2006/0261174 A1 | 11/2006 | Zellner et al. | |
| 2006/0271793 A1 | 11/2006 | Devadas et al. | |
| 2006/0287963 A1 | 12/2006 | Steeves et al. | |
| 2007/0031011 A1 | 2/2007 | Erhart et al. | |
| 2007/0036400 A1 | 2/2007 | Watanabe et al. | |
| 2007/0057763 A1 | 3/2007 | Blattner et al. | |
| 2007/0067828 A1 | 3/2007 | Bychkov | |
| 2007/0076926 A1 | 4/2007 | Schneider et al. | |
| 2007/0076951 A1 | 4/2007 | Tanaka et al. | |
| 2007/0086634 A1* | 4/2007 | Setlak et al. | 382/128 |
| 2007/0090312 A1 | 4/2007 | Stallinga et al. | |
| 2007/0138299 A1 | 6/2007 | Mitra | |
| 2007/0198141 A1 | 8/2007 | Moore | |
| 2007/0198435 A1 | 8/2007 | Siegal et al. | |
| 2007/0228154 A1 | 10/2007 | Tran | |
| 2007/0237366 A1 | 10/2007 | Maletsky | |
| 2007/0248249 A1 | 10/2007 | Stoianov | |
| 2007/0279373 A1 | 12/2007 | Lee et al. | |
| 2008/0002867 A1* | 1/2008 | Mathiassen et al. | 382/124 |
| 2008/0013805 A1 | 1/2008 | Sengupta et al. | |
| 2008/0019578 A1 | 1/2008 | Saito et al. | |
| 2008/0049987 A1 | 2/2008 | Champagne et al. | |
| 2008/0049989 A1 | 2/2008 | Iseri et al. | |
| 2008/0063245 A1 | 3/2008 | Benkley et al. | |
| 2008/0126260 A1 | 5/2008 | Cox et al. | |
| 2008/0169345 A1 | 7/2008 | Keane et al. | |
| 2008/0170695 A1 | 7/2008 | Adler et al. | |
| 2008/0175450 A1 | 7/2008 | Scott et al. | |
| 2008/0178008 A1 | 7/2008 | Takahashi et al. | |
| 2008/0179112 A1 | 7/2008 | Qin et al. | |
| 2008/0185429 A1 | 8/2008 | Saville | |
| 2008/0205714 A1* | 8/2008 | Benkley et al. | 382/126 |
| 2008/0219521 A1* | 9/2008 | Benkley et al. | 382/124 |
| 2008/0222049 A1 | 9/2008 | Loomis et al. | |
| 2008/0223925 A1 | 9/2008 | Saito et al. | |
| 2008/0226132 A1* | 9/2008 | Gardner | 382/107 |
| 2008/0240523 A1* | 10/2008 | Benkley et al. | 382/126 |
| 2008/0244277 A1 | 10/2008 | Orsini et al. | |
| 2008/0267462 A1* | 10/2008 | Nelson et al. | 382/124 |
| 2009/0130369 A1 | 5/2009 | Huang et al. | |
| 2009/0153297 A1* | 6/2009 | Gardner | 340/5.83 |
| 2009/0154779 A1* | 6/2009 | Satyan et al. | 382/124 |
| 2009/0155456 A1* | 6/2009 | Benkley et al. | 427/64 |
| 2009/0169071 A1 | 7/2009 | Bond et al. | |
| 2009/0174974 A1 | 7/2009 | Huang et al. | |
| 2009/0237135 A1 | 9/2009 | Ramaraju et al. | |
| 2009/0252384 A1 | 10/2009 | Dean et al. | |
| 2009/0252385 A1 | 10/2009 | Dean et al. | |
| 2009/0252386 A1 | 10/2009 | Dean et al. | |
| 2009/0319435 A1 | 12/2009 | Little et al. | |
| 2009/0324028 A1 | 12/2009 | Russo | |
| 2010/0026451 A1 | 2/2010 | Erhart et al. | |
| 2010/0045705 A1 | 2/2010 | Vertegaal et al. | |
| 2010/0083000 A1 | 4/2010 | Kesanupalli et al. | |
| 2010/0119124 A1* | 5/2010 | Satyan | 382/124 |
| 2010/0123675 A1* | 5/2010 | Ippel | 345/173 |
| 2010/0127366 A1 | 5/2010 | Bond et al. | |
| 2010/0176823 A1 | 7/2010 | Thompson et al. | |
| 2010/0176892 A1 | 7/2010 | Thompson et al. | |
| 2010/0177940 A1 | 7/2010 | Dean et al. | |
| 2010/0180136 A1 | 7/2010 | Thompson et al. | |
| 2010/0189314 A1 | 7/2010 | Benkley et al. | |
| 2010/0208953 A1 | 8/2010 | Gardner et al. | |
| 2010/0244166 A1 | 9/2010 | Shibuta et al. | |
| 2010/0272329 A1* | 10/2010 | Benkley, III | 382/124 |
| 2010/0284565 A1 | 11/2010 | Benkley et al. | |
| 2011/0002461 A1 | 1/2011 | Erhart et al. | |
| 2011/0018556 A1* | 1/2011 | Le et al. | 324/654 |
| 2011/0102567 A1 | 5/2011 | Erhart | |
| 2011/0102569 A1 | 5/2011 | Erhart | |

FOREIGN PATENT DOCUMENTS

| | | |
|---|---|---|
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| JP | 04158434 A2 | 6/1992 |
| WO | WO 90/3620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |

| | | |
|---|---|---|
| WO | WO 2005/104012 A1 | 11/2005 |
| WO | WO 2005/106774 A2 | 11/2005 |
| WO | WO 2005/106774 A3 | 11/2005 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Bellagiodesigns.com (Internet Archive Wayback Machine, www.bellagiodesigns.com date: Oct. 29, 2005).

* cited by examiner

FINGERPRINT SENSING ASSEMBLIES AND METHODS OF MAKING

CROSS REFERENCE TO RELATED APPLICATION

The present application is a Continuation of U.S. patent application Ser. No. 11/243,100, filed on Oct. 4, 2005, now U.S. Pat. No. 7,751,601, the disclosure of which is incorporated by reference herein. That application claims the benefit of U.S. Provisional Application No. 60/615,718, filed Oct. 4, 2004, which is hereby incorporated by reference in its entirety.

FIELD OF THE INVENTION

This invention relates to electronic fingerprint image sensing systems and methods and, more particularly, to packaging configurations and methods which provide highly reliable, low cost fingerprint sensors.

BACKGROUND OF THE INVENTION

Electronic fingerprint sensing has received increased attention as a technique for reliable identification of individuals. Electronic fingerprint sensing may be used in stationary equipment, such as security checkpoints, or in portable devices, such as mobile phones and other wireless devices, and smart cards. Accordingly, electronic fingerprint sensing systems are required to be compact, highly reliable and low in cost. A particularly advantageous fingerprint sensing system is disclosed in U.S. patent Publication No. 2003/0035570-A1, published Feb. 20, 2003.

The disclosed fingerprint sensing system includes an image sensor, a velocity sensor and a sensor circuit. The image sensor includes a linear array of capacitive sensors for capacitive sensing of ridge peaks and ridge valleys of a fingerprint on a swiped finger. The velocity sensor senses the speed of the finger as it is swiped across the image sensor. The sensor circuit supplies drive signals to the image sensor and detects image signals in response to the drive signals. The sensor circuit also supplies drive signals to the velocity sensor and detects velocity signals in response to the drive signals. The sensor circuit coordinates the image signals and the velocity signals to provide signals representative of a fingerprint image.

In order to maximize the physical and electrical robustness of an electric field-based fingerprint sensor, the sensing elements must be ruggedized by constructing them of robust materials and mechanically decoupling the sensing elements from the delicate silicon-based circuitry that activates them. The fingerprint sensor should be low in cost and protected from the abrasive, percussive and electrostatic discharge effects caused by repeated human finger contact.

Accordingly, there is a need for packaging configurations and techniques which achieve these and other objectives.

SUMMARY OF THE INVENTION

Packaging configurations and techniques using flexible and rigid materials with the above-described fingerprint sensing technology are disclosed. The fingerprint sensors are low in cost and are physically isolated from the undesired effects of repeated human finger contact. The fingerprint sensors use electrostatic methods to detect ridge peaks and ridge valleys of a fingerprint. The solid state circuitry that performs excitation and detection functions is located physically on a separate substrate. The packaging configurations provide highly reliable, low cost fingerprint sensors.

According to a first aspect of the invention, a fingerprint sensing module comprises a sensor substrate having a sensing side and a circuit side, an image sensor including conductive traces on the circuit side of the sensor substrate, and a sensor circuit including at least one integrated circuit mounted on the circuit side of the sensor substrate and electrically connected to the image sensor. The fingerprint sensing module may further comprise a velocity sensor including conductive traces on the circuit side of the sensor substrate. The sensor substrate may comprise a flexible film.

The fingerprint sensing module may further comprise a rigid substrate, wherein the circuit side of the sensor substrate is affixed to a first surface of the rigid substrate. Thus, the image sensor, the velocity sensor and the sensor circuit are physically isolated from contact with the human finger.

According to a second aspect of the invention, a fingerprint sensing module comprises a flexible substrate having a sensing side and a circuit side, an image sensor including conductive traces on the circuit side of the flexible substrate, a velocity sensor including conductive traces on the circuit side of the flexible substrate, a sensor circuit including at least one integrated circuit mounted on the circuit side of the flexible substrate and electrically connected to the image sensor and the velocity sensor, and a rigid substrate. The circuit side of the flexible substrate is affixed to a surface of the rigid substrate.

According to a third aspect of the invention, a fingerprint sensing module comprises a rigid substrate, an image sensor including conductive traces on the substrate, a velocity sensor including conductive traces on the substrate, and a sensor circuit including at least one integrated circuit mounted on the substrate and electrically connected to the image sensor and the velocity sensor. The image sensor, the velocity sensor and the sensor circuit are mounted on a first surface of the rigid substrate. The fingerprint sensing module may include a protective coating over the image sensor and the velocity sensor.

According to a fourth aspect of the invention, a method is provided for making a fingerprint sensing module. The method comprises providing a flexible substrate having a sensing side and a circuit side; forming an image sensor including conductive traces on the circuit side of the flexible substrate; forming a velocity sensor including conductive traces on the circuit side of the flexible substrate; mounting a sensor circuit including at least one integrated circuit on the circuit side of the flexible substrate; and affixing the circuit side of the flexible substrate to a surface of a rigid substrate.

According to a fifth aspect of the invention, a fingerprint sensing module comprises a first flexible substrate having an image sensor including conductive traces on the first flexible substrate and a sensor integrated circuit mounted on the first flexible substrate and electrically connected to the image sensor; a second flexible substrate having a velocity sensor including conductive traces on the second flexible substrate; and a base for mounting the first and second flexible substrates so that the conductive traces of the image sensor and the velocity sensor are substantially coplanar.

BRIEF DESCRIPTION OF THE DRAWINGS

For a better understanding of the present invention, reference is made to the accompanying drawings, which are incorporated herein by reference and wherein like elements have the same reference numerals. In the drawings.

DETAILED DESCRIPTION

Figure 1:
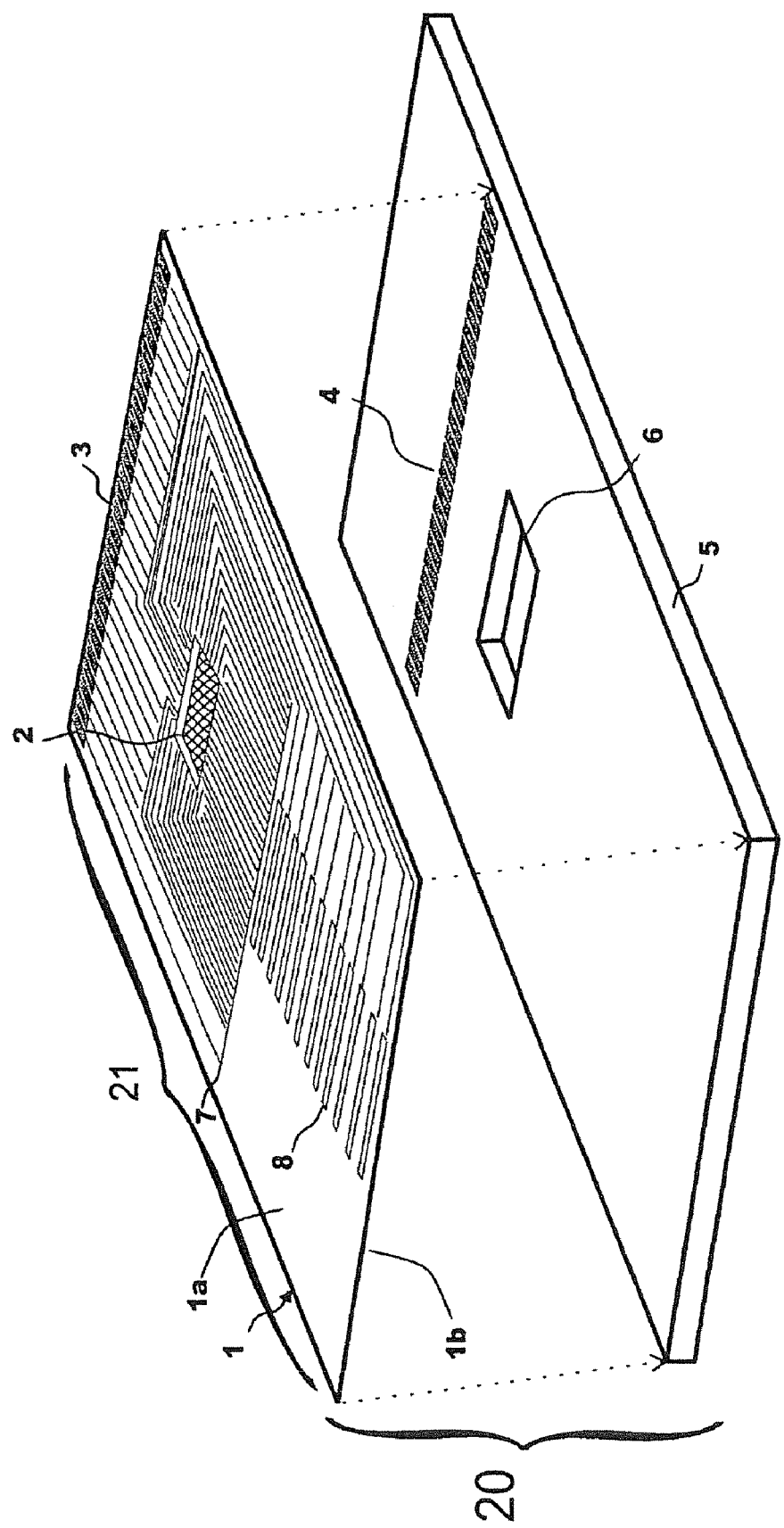
FIG. 1 is an exploded view of a fingerprint sensing module including a sensor subassembly and a rigid substrate in accordance with a first embodiment of the invention.
Figure 2:
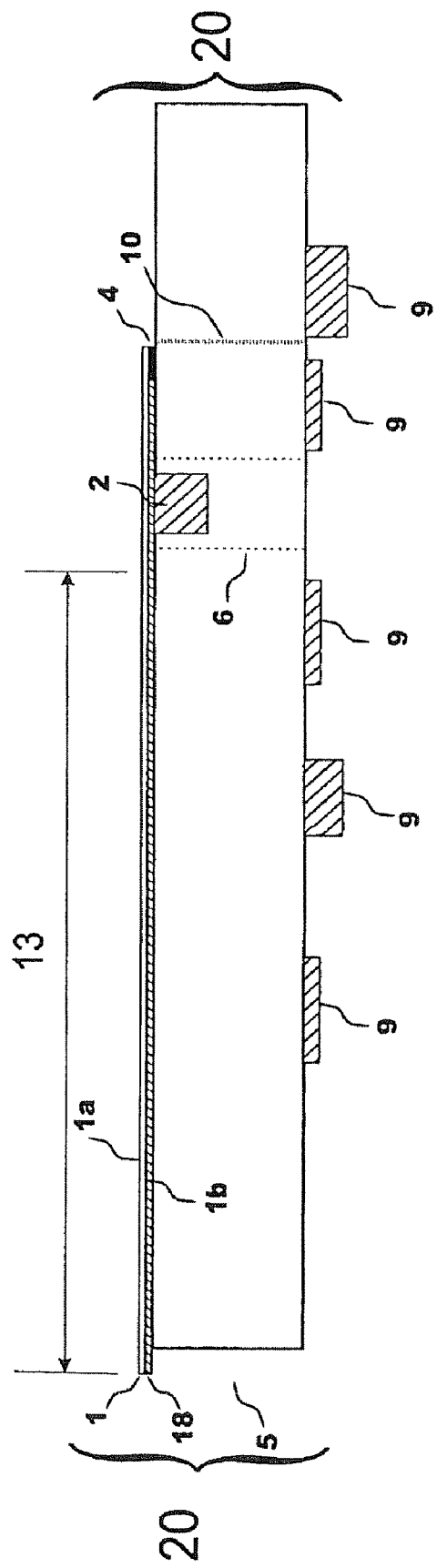
FIG. 2 is a side view of the fingerprint sensing module shown in FIG. 1.

A fingerprint sensing module 20 in accordance with a first embodiment of the invention is shown in FIGS. 1 and 2. Fingerprint sensing module 20 includes a sensor subassembly 21 and a rigid substrate 5. Sensor subassembly 21 includes a flexible substrate 1 having a sensing side 1a and a circuit side 1b. Sensor subassembly 21 further includes an image sensor 7 and a velocity sensor 8 formed as conductive traces on the circuit side 1b of flexible substrate 1. By way of example, flexible substrate 1 may be a flexible film sold under the trade name Kapton having a thickness in a range of about 25 to 100 micrometers and preferably about 38 micrometers. Image sensor 7 and velocity sensor 8 may be configured as disclosed in U.S. patent Publication No. 2003/0035570-A1, published Feb. 20, 2003, which is hereby incorporated by reference. Additional finger rate sensors are disclosed in U.S. Patent Publication No. US 2005-0244038 A1, published Nov. 3, 2005, 2005, which is hereby incorporated by reference. Sensor subassembly 21 further includes at least one sensor integrated circuit 2 attached to the circuit side 1b of flexible substrate 1. Sensor integrated circuit 2 is electrically connected to image sensor 7 and velocity sensor 8 and contains drive and sense electronics for fingerprint sensing as disclosed in the above-identified patent publication.

As disclosed in the above-identified patent publication, image sensor 7 may include a linear array of capacitive sensors for capacitive sensing of ridge peaks and ridge valleys of a fingerprint on a moving finger. The image sensor may include an image pickup plate disposed generally orthogonally to a direction of movement of the finger, and a plurality of image drive plates in spaced relation to the image pickup plate to define a plurality of sensor gaps between respective image drive plates and the image pickup plate. The ridge peaks and ridge valleys of the fingerprint passing over the sensor gaps produce a change in capacitance between respective image drive plates and the image pickup plate.

The velocity sensor 8 may include two or more finger detectors spaced apart along a direction of movement of the finger. Each of the finger detectors includes at least one drive plate and at least one pickup plate. An end of the finger passing over each of the finger detectors produces a change in capacitance between respective drive plates and pickup plates.

The conductive traces of the image sensor 7 and the velocity sensor 8 may be formed on flexible substrate 1 using known lithographic techniques. Interconnect pads 3 are also formed on flexible substrate 1 with the conductors of image sensor 7 and velocity sensor 8. Interconnect pads 3 provide external connections to the circuitry on sensor subassembly 21. Additional details regarding image sensor 7 and velocity sensor 8 are disclosed in the above-identified patent publication.

It will be understood that the packaging configuration and techniques disclosed herein are not limited to use with the sensors described in the above-identified patent publication. Other fingerprint image sensors may be utilized, and in some embodiments, a velocity sensor may not be required.

The conductive traces of image sensor 7, velocity sensor 8 and interconnect pads 3 are etched or otherwise formed on flexible substrate 1. Then, the sensor integrated circuit 2 is flipped and mounted onto mating pads on flexible substrate 1. Sensor integrated circuit 2 may be flip chip bonded onto flexible substrate 1 by a known assembly process referred to as chip-on-film (COF). This standard COF process involves pre-bumping the die pads and then reflowing the bumps onto mating pads on flexible substrate 1. This attachment process connects the sensor integrated circuit 2 to image sensor 7, velocity sensor 8 and interconnect pads 3, thereby forming thin flexible sensor subassembly 21.

Rigid substrate 5 is fabricated with interconnect pads 4 and a cutout 6 having larger dimensions than sensor integrated circuit 2 to allow flush mounting of sensor subassembly 21 to rigid substrate 5. Interconnect pads 3 of sensor subassembly 21 can be attached to interconnect pads 4 of rigid substrate 5 by standard techniques such as solder reflow or a conductive adhesive process such as Anisotropic Conductive Film (ACF). The sensor subassembly 21 can be attached to rigid substrate 5 using an adhesive 18. The adhesive can be a room temperature contact adhesive or a low temperature thermosetting adhesive. The rigid substrate 5 can serve as a mounting platform for electrical components 9 not contained in the sensor integrated circuit 2. Components 9 can be attached to rigid substrate 5 using standard circuit board assembly techniques before attachment of sensor subassembly 21. One of components 9 may be a connector for connection of the fingerprint sensing module 20 to a host system.

A desirable feature of fingerprint sensing module 20 is that no direct contact occurs between the finger being imaged and the sensor integrated circuit 2 or sensors 7 and 8. These components are located on the opposite surface of flexible substrate 1 from the surface where the finger is swiped. The sensor integrated circuit 2 is not in the swiping path 13 of the finger when the module is mounted in a case. Another desirable feature is that flexible substrate 1 electrically and mechanically isolates the conductive traces of image sensor 7 and velocity sensor 8 because they are sandwiched between flexible substrate 1 and rigid substrate 5. This provides a high degree of immunity from static discharge and mechanical abrasion.

Figure 3:
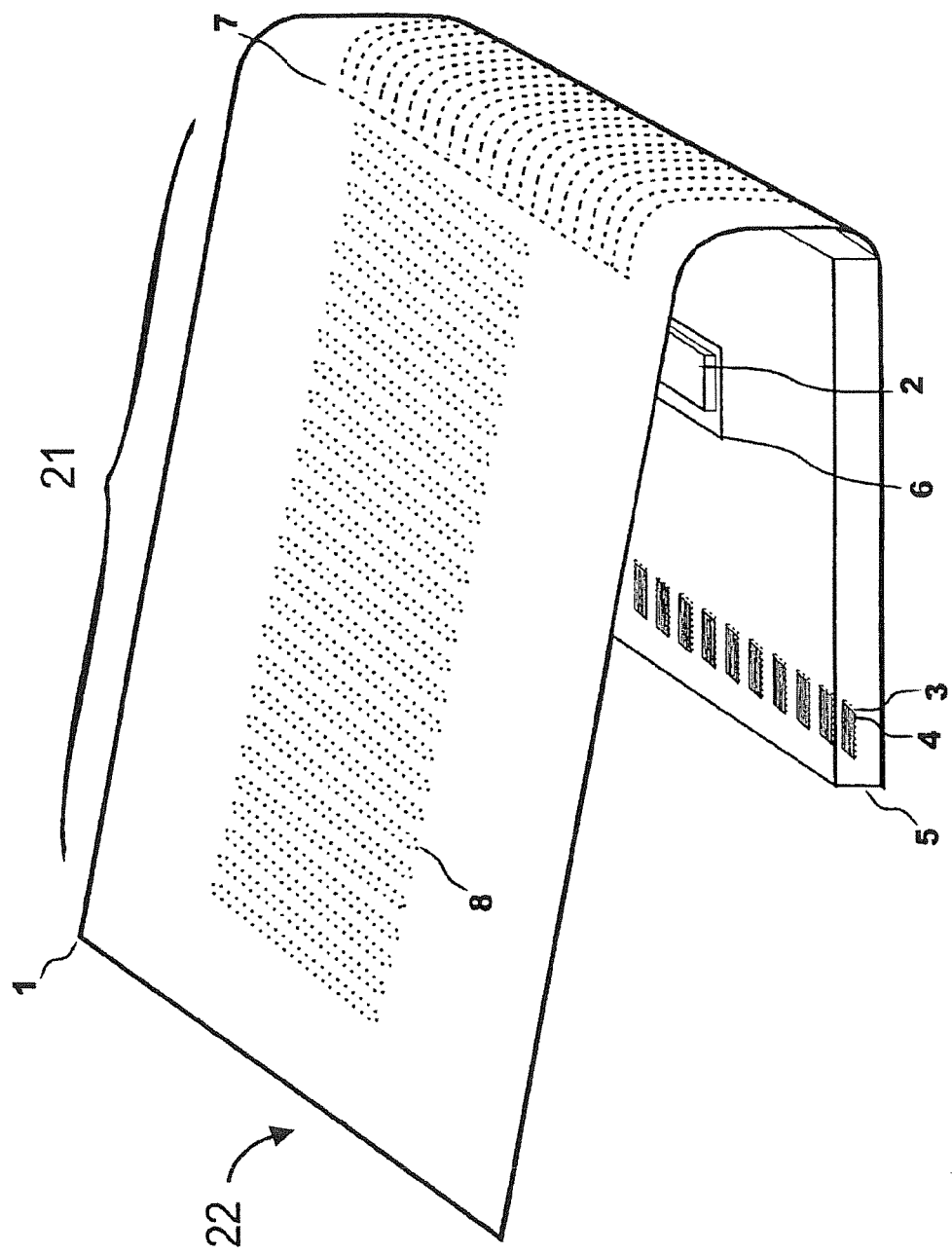
FIG. 3 illustrates a second embodiment of a fingerprint sensing module that allows the sensing portion of the flexible substrate to be attached to another device.

A fingerprint sensing module 22 in accordance with a second embodiment of the invention is shown in FIG. 3. In the embodiment of FIG. 3, a sensing section of flexible substrate 1, including image sensor 7 and velocity sensor 8, is not attached to rigid substrate 5. The sensing section of flexible substrate 1 can be attached to or formed directly to the surface of a mounting case or other structure, while another section of flexible substrate 1 can be affixed to rigid substrate 5. Rigid substrate 5 can be mounted on an internal surface or circuit board that provides mechanical support and electrical interconnection. In this embodiment, sensor subassembly 21 is larger than rigid substrate 5. The interconnect pads 3 on flexible substrate 1 may be attached to interconnect pads 4 on rigid substrate 5 using a conductive adhesive process as described above. The embodiment of FIG. 3 provides the ability to contour the sensing section of sensor subassembly 21 to a product surface or other device and/or to utilize sensor module 22 in space-constrained applications.

Figure 4:
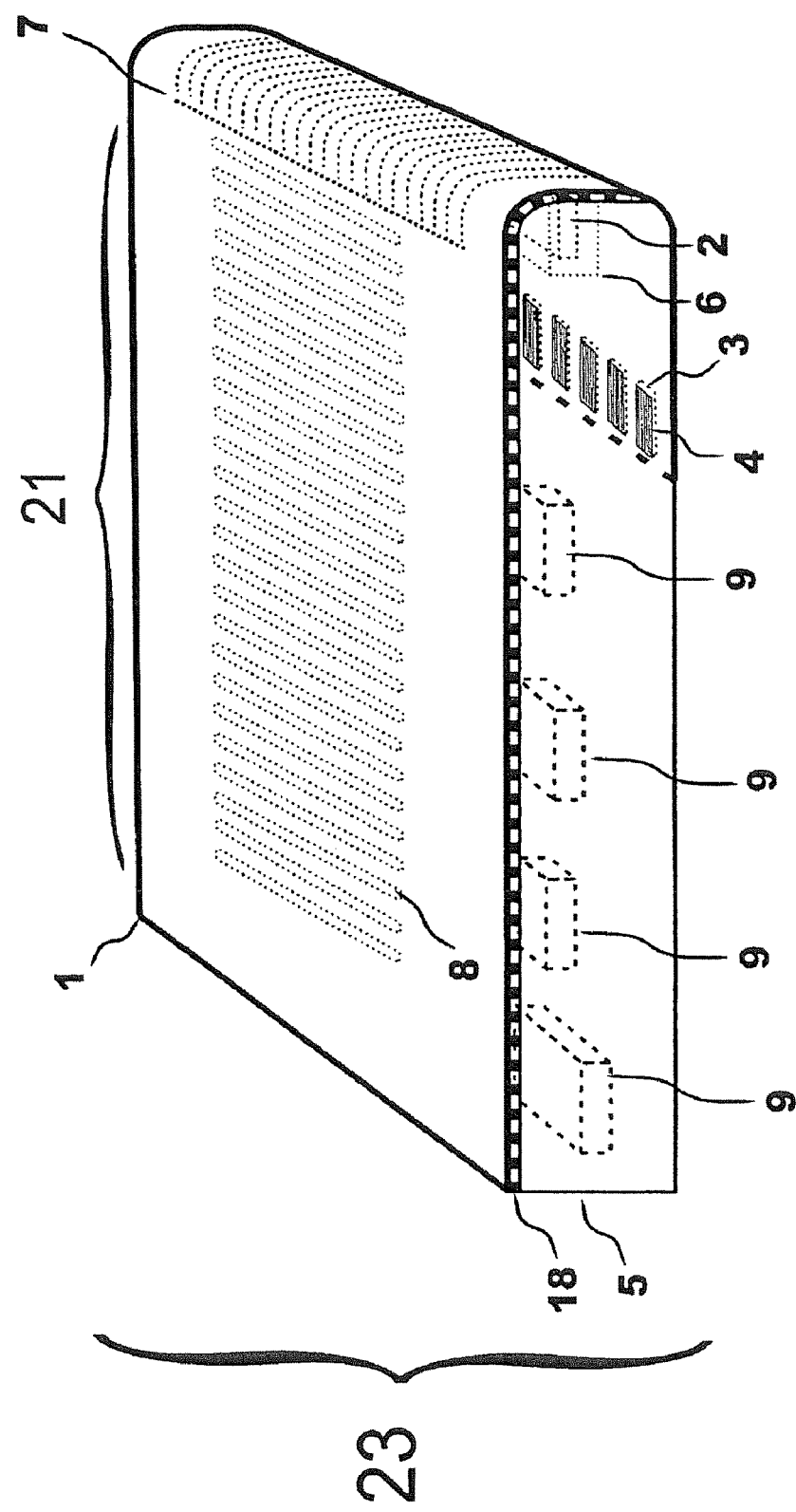
FIG. 4 illustrates a third embodiment of a fingerprint sensing module, wherein the flexible substrate is wrapped around a rigid substrate with surface-mounted components and interconnect.

A fingerprint sensing module 23 in accordance with a third embodiment of the invention is shown in FIG. 4. In the embodiment of FIG. 4, sensor subassembly 21 is wrapped around rigid substrate 5, which functions as a mechanical and electrical platform for the sensing module. As described above, sensor subassembly 21 can be attached to rigid substrate 5 using an adhesive 18. Interconnect pads 3 on flexible substrate 1 can be attached to mating interconnect pads 4 on rigid substrate 5 using a conductive adhesive as described above. Electrical components 9, optionally including a connector, are mounted on the bottom side of rigid substrate 5.

The embodiment of FIG. 4 provides the benefits of the previous embodiments in a package with reduced size and cost. This embodiment provides increased physical protection of sensor integrated circuit 2, since it is located in cutout 6 on a bottom surface of rigid substrate 5. A further benefit is realized by the image sensor 7 being in closer proximity to the edge of the package, which allows the image sensor 7 to be placed at the edge of a case or other enclosure, making it easier for the user to maintain uniform contact with the sensor surface during the swiping motion. A similar improvement may be achieved by placing a well or step in the case or other enclosure near image sensor 7.

Figure 5:
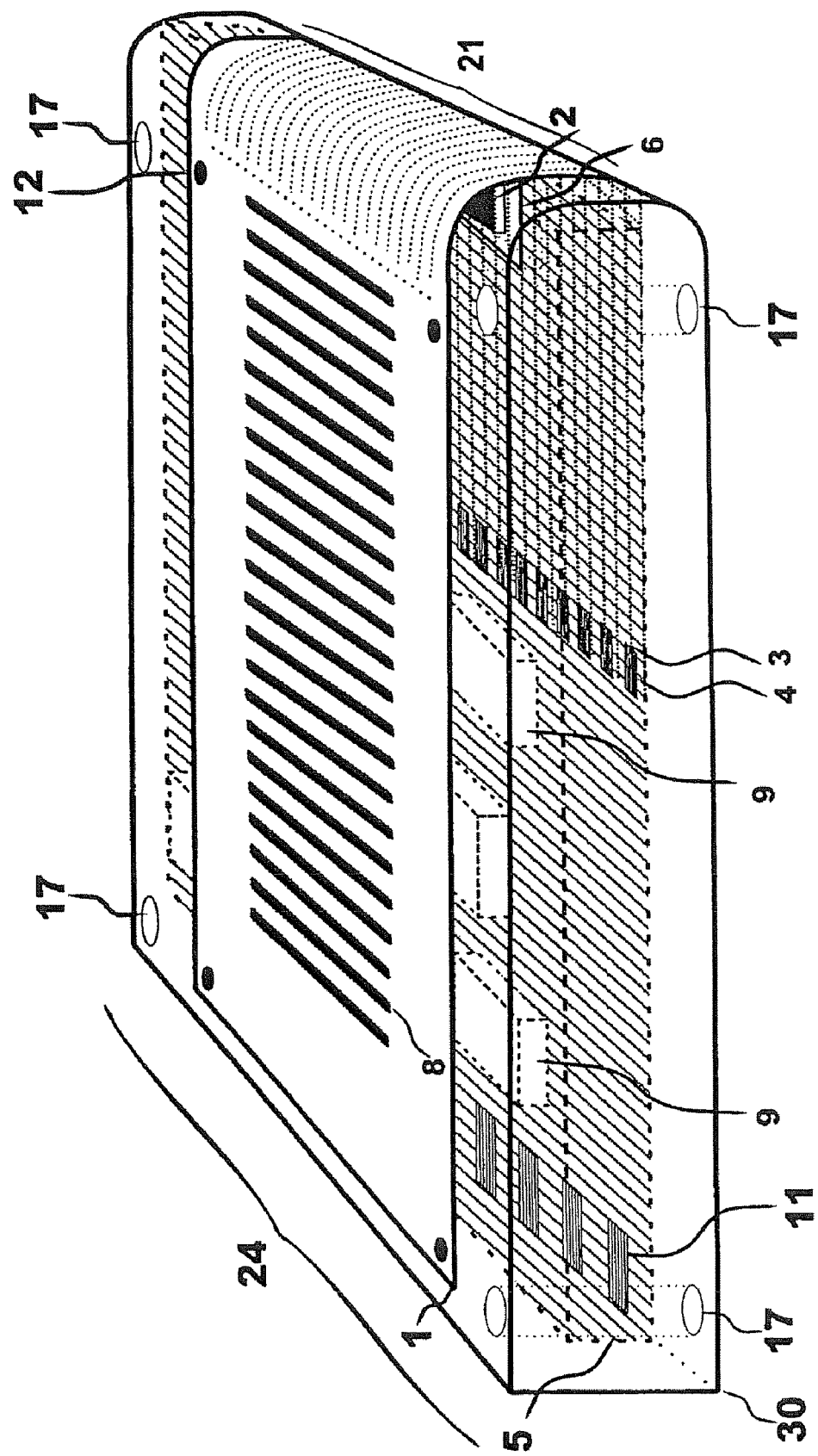
FIG. 5 illustrates a fourth embodiment of a fingerprint sensing module, wherein the flexible substrate is wrapped around a structural base that also anchors a rigid substrate with surface-mounted components and interconnect.
Figure 5A:
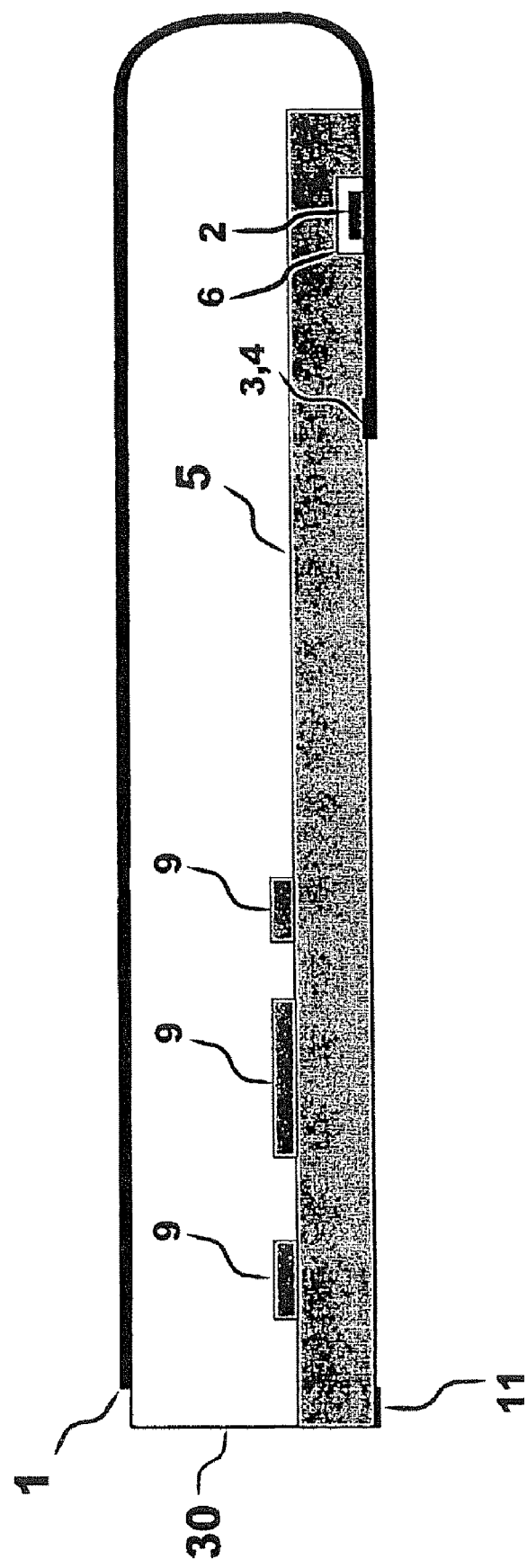
FIG. 5a is a cross section of the fingerprint sensing module of FIG. 5.

A fingerprint sensing module 24 in accordance with a fourth embodiment of the invention is shown in FIGS. 5 and 5*a*. In the embodiment of FIGS. 5 and 5*a*, sensor subassembly 21 and rigid substrate 5 are mounted to a separate structural base 30. Base 30 provides a curved surface around which sensor subassembly 21 is wrapped. The base 30 is configured to receive rigid substrate 5. In this embodiment, circuit components 9 are mounted on the upper surface of rigid substrate 5. Electrical connections between interconnect pads 3 on flexible substrate 1 and interconnect pads 4 on rigid substrate 5 are made as discussed above. Sensor subassembly 21 is attached to base 30 by aligning holes in flexible substrate 1 with mounting features 12, such as pins or mounting holes, which are molded or otherwise formed in base 30. In other embodiments, sensor subassembly 21 may be attached to base 30 with an adhesive. Rigid substrate 5 may snap into the underside of base 30. Mounting features 17 may be provided to facilitate incorporation of the sensing module 24 into a case or system. Base 30 may be made of a plastic material. In some embodiments, base 30 may be a translucent material, and one or more light sources, such as LEDs, may be mounted on rigid substrate 5 to create a backlit module.

The embodiment shown in FIGS. 5 and 5*a* includes a direct contact connector 11 that connects fingerprint sensing module 24 to its host. This process cannot be performed with standard thermal reflow or thermoset technologies; because the module has thermal limits imposed by the previously thermally cured COF and ACF connections. Module 24 may be connected to the host system using a compressible connector technology, such as a conductive elastomer strip.

Figure 6:
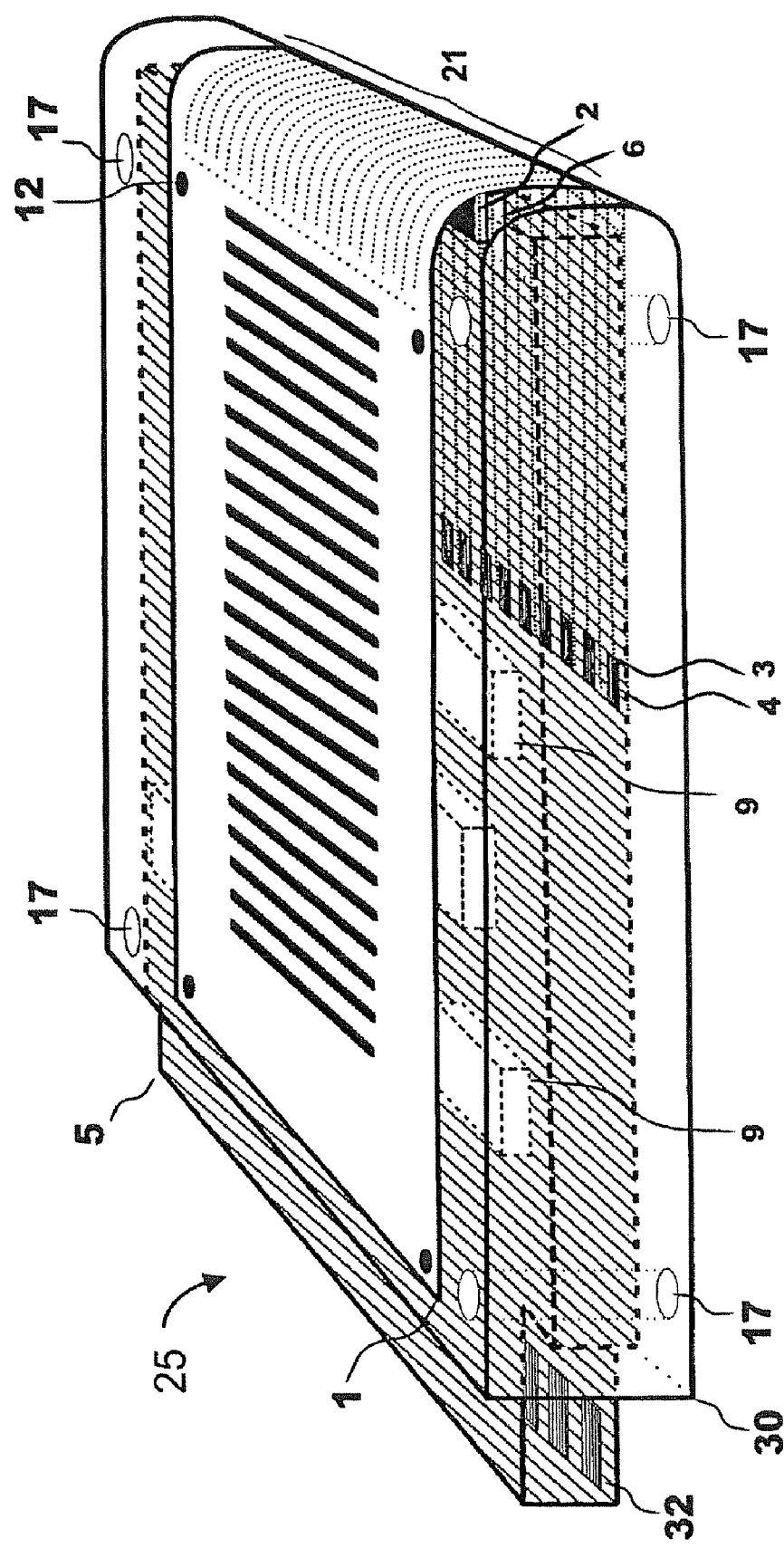
FIG. 6 illustrates a fifth embodiment of a fingerprint sensing module including an edge connector that is integral to the rigid substrate.
Figure 6A:
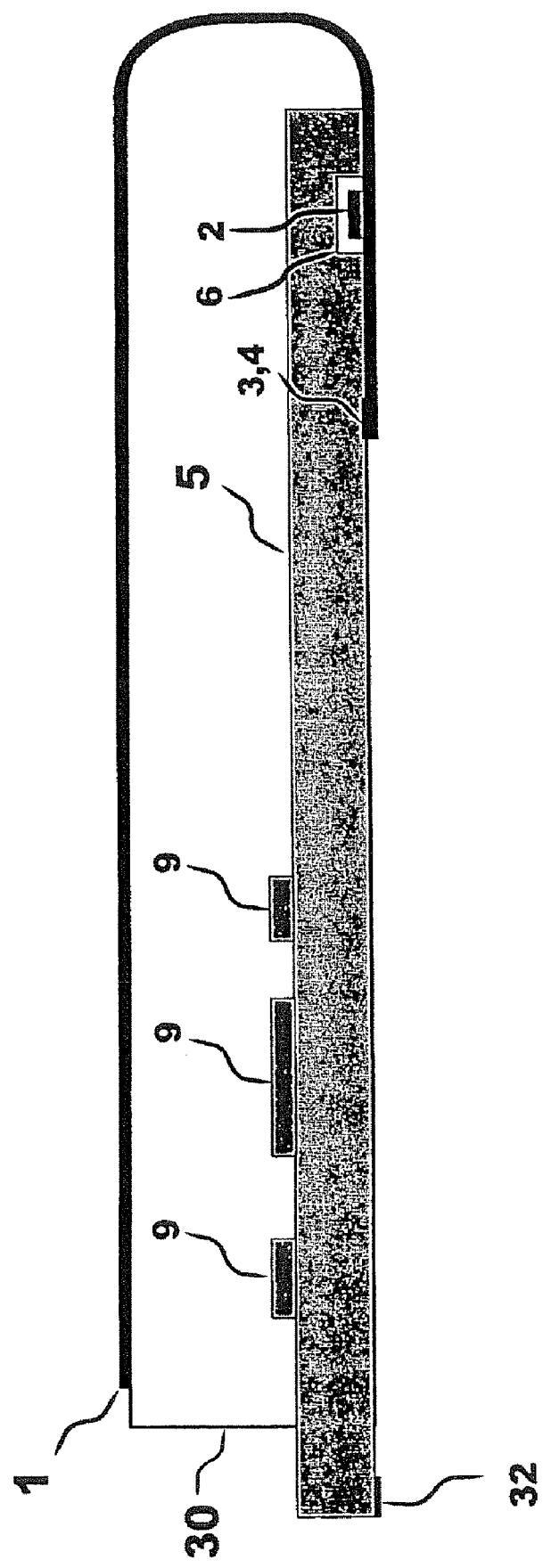
FIG. 6a is a cross section of the fingerprint sensing module of FIG. 6.

FIGS. 6 and 6*a* show a fifth embodiment of the invention where rigid substrate 5 is extended to protrude out of base 30 to facilitate connection to the host system. The connection to the host system may be implemented, for example, as metallized connector pads 32, a separate connector mounted on rigid substrate 5 or as holes in rigid substrate 5 for connection of individual wires. A fingerprint sensing module 25 is shown in FIGS. 6 and 6*a*.

In the embodiments of FIGS. 5, 5*a*, 6 and 6*a*, sensor integrated circuit 2 is protected from static discharge and mechanical damage, because integrated circuit 2 is fully enclosed in cutout 6 formed between flexible substrate 1, rigid substrate 5 and base 30. The image sensor 7 and the velocity sensor 8 are protected from mechanical wear and abrasion because they are sandwiched between flexible substrate 1 and base 30. The circuit components 9 are mechanically and electrically protected because they are sandwiched between base 30 and rigid substrate 5. The curvature of base 30 can be designed to provide an optimal surface to facilitate uniform finger contact as the user swipes his/her finger across image sensor 7 and velocity sensor 8.

Figure 7:
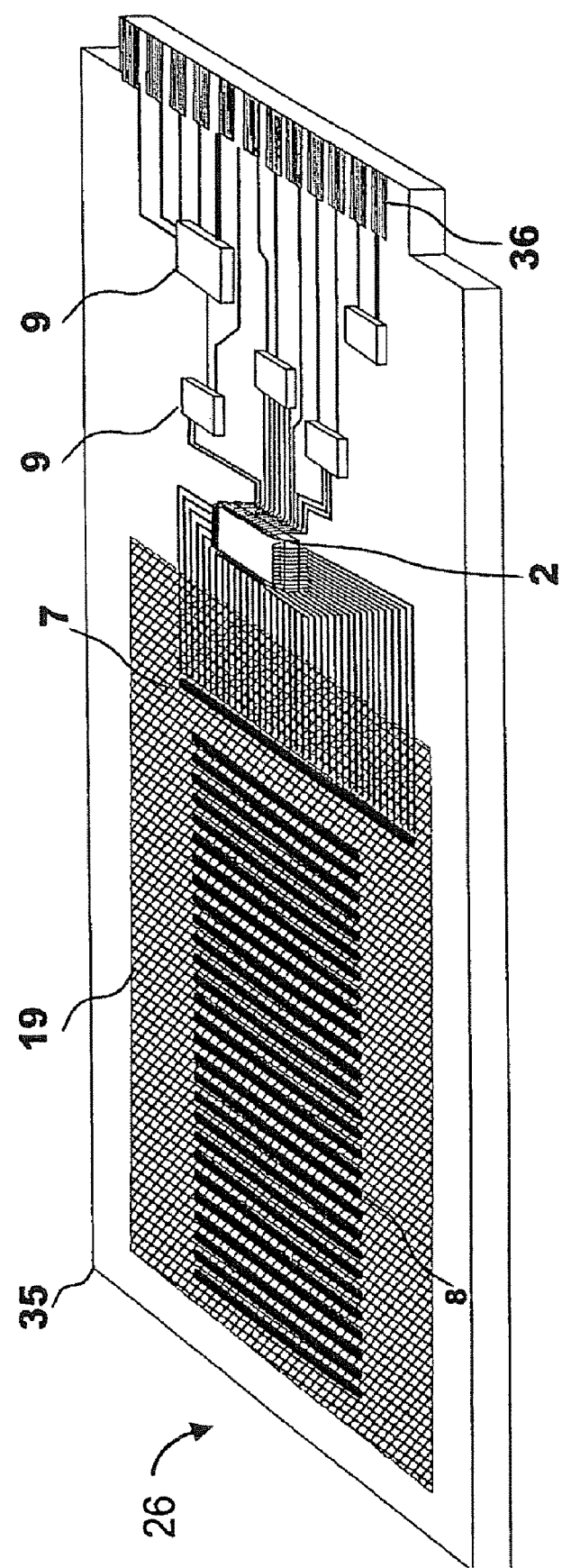
FIG. 7 illustrates a sixth embodiment of a fingerprint sensing module, including an integrated circuit attached directly to a single rigid substrate along with surface-mounted components and interconnect.

A fingerprint sensing module 26 in accordance with a sixth embodiment of the invention is shown in FIG. 7. Sensor integrated circuit 2 is mounted on the top side of a substrate 35, which can be flexible or rigid. Sensor integrated circuit 2 is attached to substrate 35, either by a direct bond wire-to-board method or by flip chip reflow bonding as discussed above. Circuit components 9 can be mounted on substrate 35 or located in the host system. The conductive traces of image sensor 7 and velocity sensor 8 are etched or otherwise formed on the top side of substrate 35 and on the same side as sensor integrated circuit 2. A protective coating 19 is applied to the top side of substrate 35 over image sensor 7 and velocity sensor 8 for electrical isolation and mechanical protection from abrasive forces.

The fingerprint sensing module of FIG. 7 has only a single substrate with fewer assembly steps and therefore potentially lower cost. The coating 19 seen by the user may be pigmented. The surface finish of coating 19 can be modified to improve swipe ergonomics. A connector 36 provides connection of the fingerprint sensing module to the host system.

Figure 8:
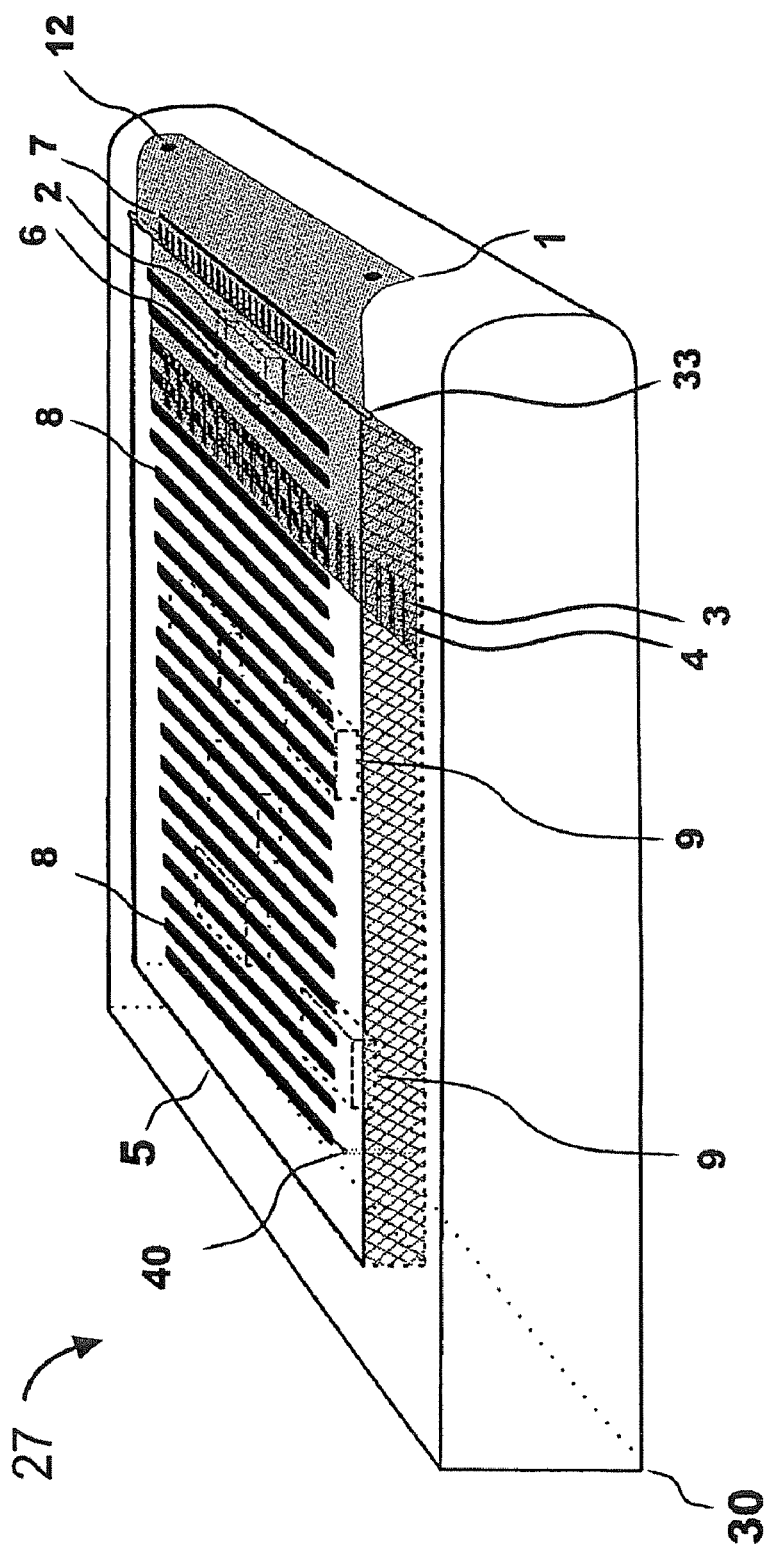
FIG. 8 illustrates a seventh embodiment of a fingerprint sensing module, including an image sensor and a velocity sensor on separate substrates.
Figure 8A:
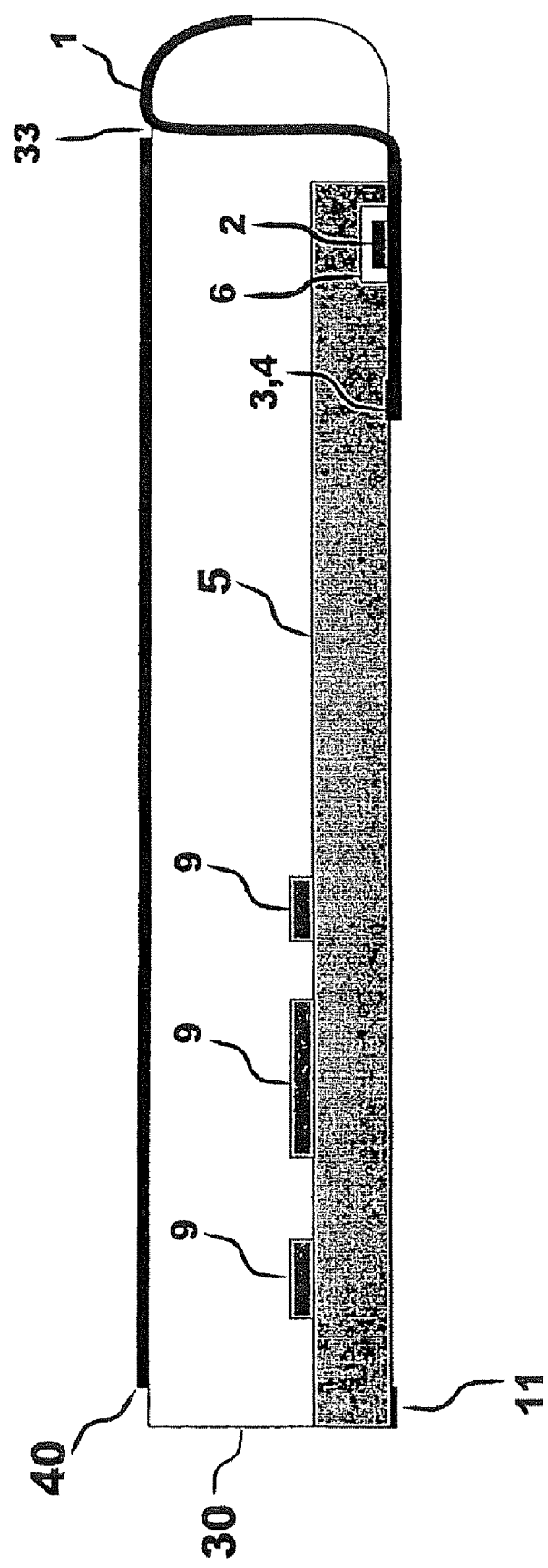
FIG. 8a is a cross section of the fingerprint sensing module of FIG. 8.

A fingerprint sensing module 27 in accordance with a seventh embodiment of the invention is shown in FIGS. 8 and 8*a*. In the embodiment of FIGS. 8 and 8*a*, velocity sensor 8 is formed on a flexible substrate 40. Image sensor 7 and interconnect pads 3 are etched or otherwise formed on flexible substrate 1, and sensor integrated circuit 2 is mounted on flexible substrate 1. Flexible substrates 1 and 40 are mounted on base 30 so that image sensor 7 and velocity sensor 8 are facing base 30 and are substantially coplanar. Rigid substrate 5 is mounted to an underside of base 30 opposite flexible substrate 40. In the embodiment of FIGS. 8 and 8*a*, a portion of flexible substrate 1 extends into a slot 33 in base 30 and is connected to rigid substrate 5. Interconnect pads 3 of flexible substrate 1 are attached to interconnect pads 4 of rigid substrate 5 as described above. The velocity sensor 8 on flexible substrate 40 can be connected to rigid substrate 5 or to flexible substrate 1 by a flexible tab. For connection to rigid substrate 5, the flexible tab may extend through slot 33. Rigid substrate 5 has electrical interconnects etched or otherwise formed on both sides and vias interconnecting different layers. Interconnect density can be increased by adding internal interconnect layers to rigid substrate 5. Electrical components 9 are mounted on the top surface of rigid substrate 5. Rigid substrate 5 may be provided with an edge connector 11. Cutout 6 may be formed on the bottom of rigid substrate 5 to accommodate sensor integrated circuit 2.

Flexible substrate 1 is electrically and mechanically connected by interconnect pads 3 to interconnect pads 4 of rigid substrate 5 as described above and is secured to base 30 by holding pins 12 or an adhesive.

A protective coating may be deposited or a protective film may be affixed to the top surface of module 27, covering flexible substrate 40, flexible substrate 1 and slot 33 so as to electrically and mechanically isolate image sensor 7 and velocity sensor 8. In the embodiment of FIGS. 8 and 8*a*, the length and cost of flexible substrate 1 are reduced in comparison with other embodiments in which velocity sensor 8 is formed on flexible substrate 1.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A fingerprint sensing module comprising:
 a sensor substrate having a sensing side to receive a finger swipe and a circuit side, opposite the sensing side, having circuitry formed thereon, wherein the sensor substrate isolates the circuitry from the finger swipe;
 an image sensor including conductive traces formed on the circuit side of the sensor substrate; and
 a sensor circuit including at least one integrated circuit mounted on the circuit side of the sensor substrate and electrically connected to the image sensor.

2. A fingerprint sensing module as defined in claim 1, further comprising a velocity sensor including conductive traces on the circuit side of the sensor substrate, wherein the velocity sensor is electrically connected to the sensor circuit.

3. A fingerprint sensing module as defined in claim 2, wherein the sensor substrate comprises a flexible film.

4. A fingerprint sensing module as defined in claim 3, further comprising a rigid substrate, wherein the circuit side of the sensor substrate is affixed to a first surface of the rigid substrate.

5. A fingerprint sensing module as defined in claim 4, wherein the circuit side of the sensor substrate is affixed to the first surface of the rigid substrate with an adhesive.

6. A fingerprint sensing module as defined in claim 4, wherein a first section of the sensor substrate is affixed to the first surface of the rigid substrate with an adhesive and a second section of the sensor substrate is attachable to another device.

7. A fingerprint sensing module as defined in claim 4, wherein the rigid substrate includes a cutout for receiving the at least one integrated circuit.

8. A fingerprint sensing module as defined in claim 4, further comprising one or more circuit components mounted on a second surface of the rigid substrate, wherein the one or more circuit components are connected to the sensor circuit.

9. A fingerprint sensing module as defined in claim 8, wherein the one or more circuit components include an electrical connector.

10. A fingerprint sensing module as defined in claim 8, wherein the one or more circuit components are connected to the sensor circuit by vias through the rigid substrate.

11. A fingerprint sensing module as defined in claim 4, wherein the sensor substrate and the rigid substrate are electrically connected by conductive adhesive between conductive interconnect pads on the respective substrates.

12. A fingerprint sensing module as defined in claim 4, wherein the sensor substrate has a larger area than the rigid substrate.

13. A fingerprint sensing module as defined in claim 4, wherein the sensor substrate is affixed to at least two surfaces of the rigid substrate.

14. A fingerprint sensing module as defined in claim 4, further comprising a base for mounting of the sensor substrate and the rigid substrate.

15. A fingerprint sensing module as defined in claim 14, wherein the base has a curved surface for mounting of the sensor substrate.

16. A fingerprint sensing module as defined in claim 3, wherein the at least one integrated circuit is affixed to the sensor substrate by a chip-on-film process.

17. A fingerprint sensing module as defined in claim 2, wherein said velocity sensor comprises two or more finger detectors spaced apart along a direction of movement of the finger, each of said finger detectors including at least one drive plate and at least one pickup plate, wherein an end of the finger passing over each of said finger detectors produces a change in capacitance between respective drive plates and pickup plates.

18. A fingerprint sensing module as defined in claim 2, wherein the sensor substrate comprises a rigid substrate.

19. A fingerprint sensing module as defined in claim 1, wherein the image sensor comprises a linear array of capacitive sensors for capacitive sensing of ridge peaks and ridge valleys of a fingerprint on a moving finger.

20. A fingerprint sensing module as defined in claim 19, wherein the image sensor comprises an image pickup plate disposed generally orthogonally to a direction of movement of the finger, and a plurality of image drive plates in spaced relation to said image pickup plate to define a plurality of sensor gaps between respective image drive plates and said image pickup plate, wherein the ridge peaks and ridge valleys of the fingerprint passing over the sensor gaps produce a change in capacitance between respective image drive plates and said image pickup plate.

21. A fingerprint sensing module as defined in claim 20, wherein said image pickup plate and said plurality of image drive plates are substantially coplanar.

22. A fingerprint sensing module as defined in claim 1, wherein the sensor substrate is configured so that a finger is swiped over the sensing side of the sensor substrate for fingerprint sensing.

23. A fingerprint sensing module as defined in claim 1, further comprising a flexible substrate having a velocity sensor including conductive traces on the flexible substrate, wherein the velocity sensor is electrically connected to the sensor circuit, and a base for mounting the sensor substrate and the flexible substrate such that the image sensor and the velocity sensor are substantially coplanar.

24. A fingerprint sensing module comprising:
 a flexible substrate having a sensing side to receive a finger swipe and a circuit side, opposite the sensing side, having circuitry formed thereon, wherein the flexible substrate isolates the circuitry from the finger swipe;
 an image sensor including conductive traces formed on the circuit side of the flexible substrate;
 a velocity sensor including conductive traces formed on the circuit side of the flexible substrate;

a sensor circuit including at least one integrated circuit mounted on the circuit side of the flexible substrate and electrically connected to the image sensor and the velocity sensor; and a rigid substrate, wherein the circuit side of the flexible substrate is affixed to a surface of the rigid substrate.

25. A fingerprint sensing module comprising:

a rigid substrate;

an image sensor including conductive traces formed on the substrate, wherein the image sensor comprises a linear array of capacitive sensors for capacitive sensing of ridge peaks and ridge valleys of a fingerprint on a moving finger;

a velocity sensor including conductive traces formed on the substrate; and a sensor circuit including at least one integrated circuit mounted on the substrate and electrically connected to the image sensor and the velocity sensor, wherein the image sensor, the velocity sensor and the sensor circuit are mounted on a first surface of the rigid substrate.

26. A fingerprint sensing module as defined in claim 25, further comprising a protective coating over the image sensor and the velocity sensor.

27. A fingerprint sensing module as defined in claim 25, wherein the image sensor comprises an image pickup plate disposed generally orthogonally to a direction of movement of the finger, and a plurality of image drive plates in spaced relation to said image pickup plate to define a plurality of sensor gaps between respective image drive plates and said image pickup plate, wherein the ridge peaks and ridge valleys of the fingerprint passing over the sensor gaps produce a change in capacitance between respective image drive plates and said image pickup plate.

28. A fingerprint sensing module as defined in claim 27, wherein the velocity sensor comprises two or more finger detectors spaced apart along a direction of movement of the finger, each of said finger detectors including at least one drive plate and at least one pickup plate, wherein an end of the finger passing over each of said finger detectors produces a change in capacitance between respective drive plates and pickup plates.

29. A method for making a fingerprint sensing module, comprising:

providing a flexible substrate having a sensing side to receive a finger swipe and a circuit side, opposite the sensing side, having circuitry formed thereon, wherein the flexible substrate isolates the circuitry from the finger swipe;

forming an image sensor including conductive traces on the circuit side of the flexible substrate;

forming a velocity sensor including conductive traces on the circuit side of the flexible substrate;

mounting a sensor circuit including at least one integrated circuit on the circuit side of the flexible substrate; and affixing the circuit side of the flexible substrate to a surface of a rigid substrate.

30. A fingerprint sensing module comprising:

a first flexible substrate having an image sensor including conductive traces formed thereon, and a sensor integrated circuit mounted on the first flexible substrate and electrically connected to the image sensor;

a second flexible substrate having a velocity sensor including conductive traces formed thereon; and a base for mounting the first and the second flexible substrates so that the conductive traces of the image sensor and the velocity sensor are substantially coplanar.

31. A fingerprint sensing module as defined in claim 30, further comprising a rigid substrate mounted to the base and connected to the first flexible substrate.

* * * * *